Oct. 20, 1970  H. HAAS ET AL  3,534,439

MOLDING APPARATUS

Original Filed March 9, 1966

Edmund Munk, Herbert Haas, Gert Weinberg
*INVENTOR.*

BY *Dicke & Craig*
ATTORNEYS

United States Patent Office
3,534,439
Patented Oct. 20, 1970

3,534,439
MOLDING APPARATUS
Herbert Haas, Edmund Munk, and Gerd Weinberg, Oberstenfeld, Wurttemberg, Germany, assignors to Furnier- und Sperrholzwerk J. F. Werz, Jr., K.G., Werzalit-Pressholzwerk, Oberstenfeld, Wurttemberg, Germany
Continuation of application Ser. No. 532,979, Mar. 9, 1966. This application Feb. 3, 1969, Ser. No. 802,719
Claims priority, application Germany, Apr. 13, 1965, F 45,800
Int. Cl. B30b 1/32
U.S. Cl. 18—16          5 Claims

ABSTRACT OF THE DISCLOSURE

The present disclosure is directed to a molding apparatus comprising a mold having a mold bottom and frame members surrounding said mold bottom, said frame members being slidably disposed in the vertical direction along the lateral sides of the mold bottom, lifting and lowering means communicating with the frame members for raising or lowering said frame members, the upper portion of said frame members in the raised position projecting above the upper surface of the mold bottom and defining a mold cavity therebetween whereas in the lowered position, the upper portion of said frame member is at the same or lower level as the upper surface of the mold bottom, and pressure member means disposed above the mold cavity and the lateral frame members, said pressure member means being adapted to engage the lateral frame members and the material to be compressed in the mold cavity against the lifting action of the lifting and lowering means so that during the entire compression of the material it is confined by the frame members.

---

This application is a continuation of Ser. No. 532,979, filed Mar. 9, 1966, now abandoned.

The present invention relates to an apparatus for molding a mixture of comminuted fibrous materials and a suitable binder under pressure into solid products, and more particularly the invention relates to a mold which is preferably filled with the loose mixture at a position spaced from the molding press and is then moved into the press to a fixed position underneath the vertically movable punch or pressure plate of the press which is thereafter moved downwardly to compress the loose material within the mold.

Prior to this invention it has been conventional, especially for producing flat molded objects such as plates, panels, or the like, to employ a supporting plate upon which a separate frame is placed, and to fill the loose fibrous mixture into this frame on the supporting plate so as to form a layer which fills the frame uniformly up to its upper edges or up to a certain level in accordance with the necessary quantity of material which, when thereafter compressed, forms the desired plate, panel, or the like of the required density and thickness. In order to increase the rate of production, this filling operation is usually carried out at a position spaced of the molding press while the press is being operated to compress a layer of the loose mixture which has previously been spread on another supporting plate. After the filling operation, the frame is either removed entirely from the supporting plate and the layer of loose material thereon before the plate and layer are inserted into the molding press or the front and rear parts of the frame are removed, while the lateral frame parts remain in a stationary position, whereupon the supporting plate with the layer thereon is shifted along and past the lateral frame parts and then into the molding press.

This prior method which has been employed for a preliminary compression without heat for producing premolded blanks as well as for a one-stage molding operation under heat and pressure has the disadvantage that, after the supporting plate with the layer of loose material thereon is inserted into the molding press, the sides and opposite ends of the layer are no longer confined by the filling frame and may therefore yield laterally when the upper pressure plate of the press is moved down and compresses the layer. Consequently, when the molded article is removed from the press, its outer edges are not sharply angular but rounded and irregular, and considerable parts adjacent to these edges have a much lower density than the central parts of the article. These marginal parts must therefore be trimmed off in a separate operation so that the remainder of the article will have a uniform density. This additional trimming operation reduces the rate of production and increases the cost of the molded articles because of the waste of time and labor and also because of the amount of scrap which is thereby formed.

It is an object of the present invention to provide a molding apparatus which eliminates the above-mentioned disadvantages and permits a mixture of comminuted fibrous materials, for example, wood chips, and a suitable binder to be molded under pressure either with or without the application of heat so as to form molded articles including flat plates or panels with sharply angular edge portions of a uniform shape which, without requiring any trimming operation, also have a uniform controlled density equal to that of other, more central parts of the article.

It is another feature of the apparatus according to the invention that the same element thereof which insures the uniformity and sharp angularity of the edge portions of the molded article may be designed so as to eliminate the need for a separate ejector and to permit this article to be easily removed from the mold at the end of the molding operation after the upper pressure plate or the like has been lifted by the press.

A further feature of the invention consists in the provision of very simple means for adjusting the molding apparatus so as to permit articles of different outer dimensions and thicknesses to be produced.

These and other features and advantages of the present invention will become more clearly evident from the following detailed description thereof which is to be read with reference to the accompanying diagrammatic drawings, in which:

FIG. 3 shows a cross section similar to FIG. 2, but illustrates the apparatus at the end of the molding operation; while

Figure 1:
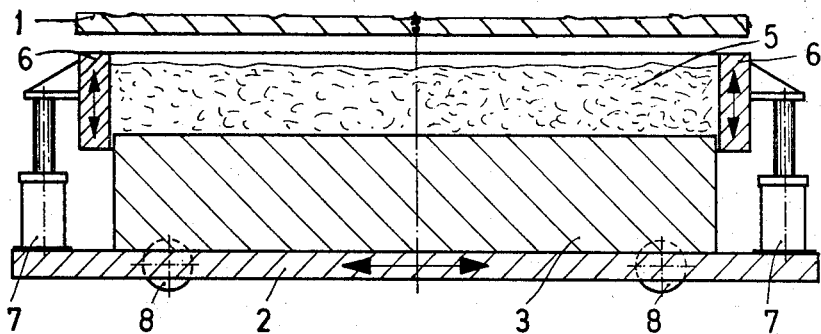
FIG. 1 shows a longitudinal section of a molding apparatus according to the invention after the mold has been filled and moved into the molding press.
Figure 2:
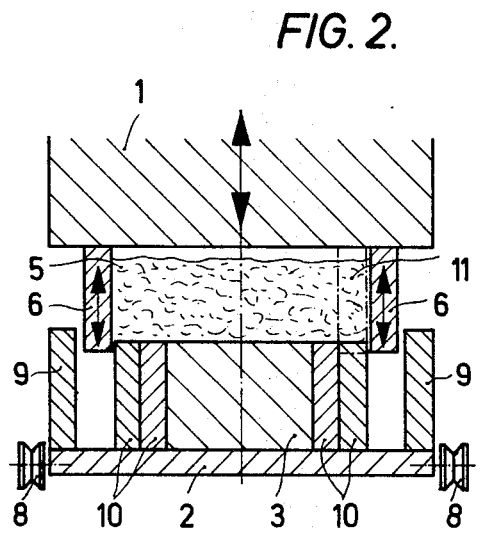
FIG. 2 shows a cross section of the same molding apparatus which is taken at right angles to FIG. 1, but shows the upper pressure plate lowered into engagement with the mold frame.
Figure 3:
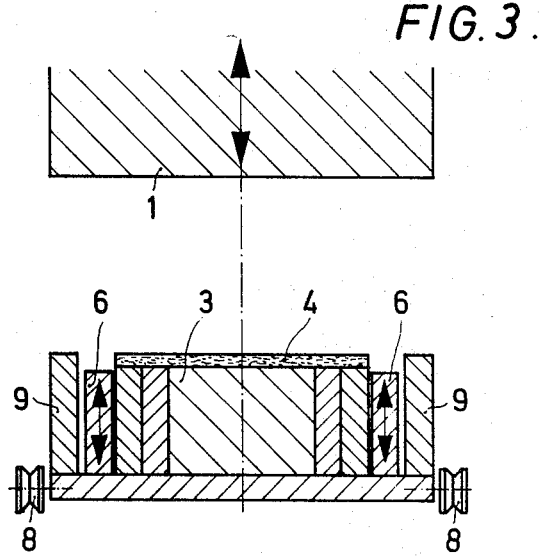

As illustrated in FIGS. 1 to 3, the new molding apparatus comprises an upper punch 1 which may, for example, be in the form of a flat plate and is secured to the upper ram of a mechanical or hydraulic press, and a lower mold which essentially consists of a base plate 2 on which a thick bottom plate 3 is mounted which has a length and width equal to those of the article to be molded, for example, of a panel 4 as shown in FIG. 3 and a thickness slightly greater than that of the layer 5 of the loose fibrous mixture which is required for producing this article. This material may be of any suitable composition and may consist, for example, of wood chips which are mixed with a suitable thermoplastic. The bottom plate 3 is surrounded by a frame 6 which is slidable in the vertical direction along the side and end walls of this plate 3, preferably by means of hydraulic or pneumatic cylinder and piston units 7 which are mounted on the base plate 2 and are operated simultaneously by suitable control means, not shown, so as to raise the frame 6 from the base plate 2 to a level in which its upper edges preferably determine the amount of loose fibrous material which should be filled into the frame in order to be compressed by the male mold 1 to the desired thickness and density. In order to increase the rate of production, two or more equal molds are preferably provided in association with each press so that, while one or more molds are being filled with the loose fibrous material 5 at locations away from the press, another mold which has been previously filled may be moved to the proper position within the press, for example, on wheels 8, and its contents be compressed by the punch or pressure plate 1.

The cylinder and piston units 7 and their control means are preferably designed so as to exert a constant back pressure against the downward pressure of the molding press during the actual molding operation and to effect a positive movement of the frame 6 in the downward direction when at the end of the compression stroke the punch or pressure plate 1 engages upon the spacing members 9 which are mounted on the base plate 2. Since frame 6 is made of a slightly lower height than the bottom plate 3, the article 4 may be easily slipped or lifted off the bottom plate 3 after the punch or pressure plate has been raised at the end of the compression stroke of the press. Frame 6 therefore serves for the purpose of determining the proper amount of fibrous material 5 which is required for molding the article 4, of insuring that the material 5, after being filled into the mold, will be properly confined therein so that especially during the compression stroke the outer edge portions of the layer of material 5 cannot yield outwardly but will then be subjected by the punch or pressure plate 1 to the same pressure as other more central parts of the layer with the result that the edge portions of the molded article 4 will be sharply rectangular and have the same density as the other parts thereof, and of permitting the finished article 4 to be easily removed from the mold after the punch 1 has been raised without requiring any additional ejecting means.

In order to permit the mold according to the invention to be adjustable to permit the production of articles 4 of different dimensions, the central part of the bottom plate 3 may be made of a length and width equal to those of the smallest articles 4 to be produced and the frame 6 of an inner length and width equal to those of the largest articles 4. Additional plates 10 may then be secured to the side or end walls of central part of the bottom plate 3 and corresponding plates 11 to the inner sides of frame 6 in order to produce articles 4 of the desired outer dimensions. The thickness of these articles may also be varied by exchanging the spacing members 9 on the base plate 4 for others of a different height.

Figure 4:
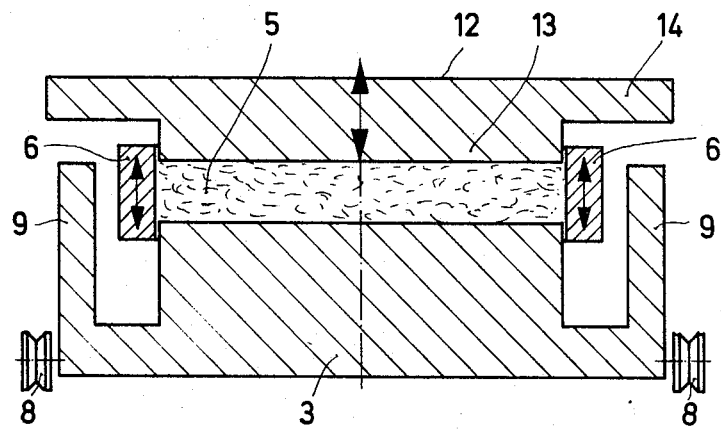
FIG. 4 shows a cross section similar to FIG. 2 of a modification of the molding apparatus according to the invention.

FIG. 4 illustrates diagrammatically a modification of the molding apparatus according to the invention in which the pressure plate 12 has a thicker central part 13 which has a length and width substantially in accordance with the inner dimensions of frame 6 and is adapted during the first part of its compression stroke to pass into the frame and compress the layer of loose material 5 to a certain thickness and density before the lateral parts 14 engage upon the frame 6 and move the same downwardly during the last part of the compression stroke until these parts 14 also engage upon the spacing members 9. This mold may in every other respect be of the same construction and be similarly adjustable as the mold according to FIGS. 1 to 3, and frame 6 may be retractable by similar means as shown in FIG. 1 so as to permit the molded article to be lifted or slipped off the upper surface of the bottom plate 3 after the pressure plate 12 has been raised by the molding press.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A molding apparatus comprising a base, a mold bottom fixedly mounted on said base, slidable frame members surrounding said mold bottom, said frame members and independent thereof being slidable in the vertical direction along the lateral sides of said mold bottom, said mold bottom and the inner walls of said frame members defining a mold cavity, pressure member means movably mounted above said mold bottom and slidable frame members, said pressure member means being vertically movable to engage the upper surface of said frame members and the material to be compressed, and means mounted on said base for selectively lifting and lowering said frame members independently from the movement of said pressure member means to selectively control the initial depth of said mold cavity, said lifting and lowering means being capable of lowering said frame members until the upper surface of said frame members is disposed no higher than said mold bottom.

2. The molding apparatus of claim 1, wherein spacing members are disposed lateral to the frame members for limiting the length of the compression stroke of the pressure member means.

3. The molding apparatus of claim 2, wherein the dimensions of the mold bottom, the frame members and the height of the spacing members can be varied to permit the manufacture of molded articles of different dimensions.

4. The molding apparatus of claim 2, wherein the pressure member means has a lower portion with dimensions which permits it to just enter into the mold during the first part of the compression stroke and an upper portion which has lateral extensions which are adapted to engage upon and carry along the frame members during the last part of said compression stroke and also engage upon the spacing means at the end of the compression stroke.

5. The molding apparatus of claim 1, wherein a plurality of molds is provided for one pressure member means, said pressure member means being located at a compressing station, and which includes a filling station, means for sequentially filling the molds with material to be compressed at said filling station, means for moving the molds to the compressing station where the material is compressed into a solid article, means for removing the article from the mold, and means for returning the mold to the filling station.

References Cited
UNITED STATES PATENTS

| | | | |
|---|---|---|---|
| 1,005,706 | 10/1911 | Hlock | 25—41.3 X |
| 1,648,721 | 11/1927 | Claus | 18—16.7 X |
| 2,336,982 | 12/1943 | Cremer | 18—16.5 |
| 2,398,227 | 4/1946 | Hubbert | 18—16.5 |

J. HOWARD FLINT, Jr., Primary Examiner

U.S. Cl. X.R.

18—2